United States Patent [19]
Hattori et al.

[11] Patent Number: 5,497,683
[45] Date of Patent: Mar. 12, 1996

[54] HOLDING DEVICE FOR CUTTING A TORIC LENS

[75] Inventors: Kenshiro Hattori; Koichi Inada, both of Seki, Japan

[73] Assignee: Menicon Co., Ltd., Nagoya, Japan

[21] Appl. No.: 191,589

[22] Filed: Feb. 4, 1994

[30] Foreign Application Priority Data

Feb. 8, 1993 [JP] Japan .................................. 5-043220

[51] Int. Cl.⁶ ............................... B23B 5/22; B23B 5/44
[52] U.S. Cl. ......................................... 82/18; 279/6
[58] Field of Search .............................. 82/18, 146, 165; 279/6

[56] References Cited

U.S. PATENT DOCUMENTS

| | | |
|---|---|---|
| 3,066,560 | 12/1962 | Estephanio . |
| 4,210,039 | 7/1980 | Willemin ..................................... 82/18 |
| 4,884,482 | 12/1989 | Council, Jr. . |
| 4,947,715 | 8/1990 | Council, Jr. . |
| 5,195,407 | 3/1993 | Takeno et al. . |
| 5,309,800 | 5/1994 | Yuhara ........................................ 82/18 |

FOREIGN PATENT DOCUMENTS

| | | |
|---|---|---|
| 2100619 | 3/1972 | France . |
| 48495 | 9/1889 | Germany . |
| 63-12742 | 3/1988 | Japan . |

*Primary Examiner*—Mark Rosenbaum
*Assistant Examiner*—Kenneth J. Hansen
*Attorney, Agent, or Firm*—Oblon, Spivak, McClelland, Maier, & Neustadt

[57] ABSTRACT

A holding device for cutting a toric lens includes a chuck member which holds the lens workpiece, with a rotation and guide assembly provided such that an axis of the chuck member moves along a line perpendicular to the axis of rotation. The chuck member is held by a chuck support member, and the chuck support member includes guide ends which move along an inner periphery of a guide hole of a guide member. The guide hole has a center axis which is eccentric with respect to a rotation axis in a direction orthogonal to the rotation axis, such that as the guide ends of the chuck support member move along the inner periphery of the guide hole, the chuck member rotates while the chuck axis moves along a line which is orthogonal to the rotation axis.

13 Claims, 7 Drawing Sheets

HOLDING DEVICE FOR CUTTING A TORIC LENS

This invention relates to a holding device which is employed for holding a lens workpiece in cutting an optical lens such as a contact lens, an intraocular lens or the like, particularly to a holding device for cutting a toric lens which is preferably employed in making an optical lens having a toric shape.

Conventionally, in the field of optics, especially the field of a lens for an eye in the ophthalmology, other than a simple spherical lens, an optical lens having a toric shape has been employed as a contact lens for correction of astigmatism or the like.

Conventionally, various methods have been proposed as methods for making a toric lens, for instance, in Japanese Examined Patent Publication No. 12742/1988, wherein a lens workpiece is driven to rotate around an axis and its surface is spherically cut by a cutting bit, under a state wherein a roughly machined lens workpiece is deformed in compression or bending in the radial direction.

However, in such a method, a lens product of high quality is difficult to obtain, since the lens workpiece is forcibly deformed which adversely influences on the lens workpiece such as causing strain or the like.

Further, a method of making an aspherical lens has been proposed in U.S. Pat. Nos. 4,947,715 and 4,884,482, wherein a lens workpiece is held by a holding device and is rotated around an axis, and a cutting bit is swung around an axis which is orthogonal to the rotating axis of the lens workpiece, while contacting the cutting bit to the lens workpiece, thereby cutting the surface of the lens workpiece. The rotation angle of the lens workpiece and the swing angle of the cutting bit are detected. The lens workpiece (holding device) is reciprocated toward and away from the cutting bit by a predetermined amount in accordance with the swing angle of the cutting bit.

However, considering an economical cutting speed of the lens workpiece by the cutting bit, it is necessary to rotate the lens workpiece at a high speed of at least 1000 rpm or more. Accordingly, it is necessary to reciprocate the lens workpiece and the holding device holding the lens workpiece at a rate of 2000 times or more per minute. To reciprocate the holding device having a rotation driving mechanism at such a high rate, it is necessary to provide a driving device having an extremely large output. In addition thereto, a vibration (deviation) around an axis of a rotating shaft is apt to amplify in accordance with the reciprocating movement, and the compatibility in both the productivity and working accuracy is extremely difficult to achieve. Therefore, its reduction to practice is considerably difficult.

This invention has been carried out with the above situation as the background, and it is an object of the present invention to provide a holding device for cutting a toric lens capable of making a high quality toric lens having no strain or the like, with an excellent working accuracy and a good productivity.

According to an aspect of the present invention, there is provided a holding device for cutting a toric lens for holding a lens workpiece in forming a toric lens by cutting the lens workpiece comprising:

a chuck member for holding the lens workpiece;

a guide member having a circular guide hole provided outside of the chuck member;

a chuck support member provided in the circular guide hole of the guide member rotatably around a rotation major axis eccentric to a center axis of the circular guide hole and displaceably on a displacement straight line orthogonal to the rotation major axis and rotating with the rotation major axis, said chuck member being displaced on the displacement straight line in accordance with a rotation of the chuck support member relative to the guide member through guiding end portions of the chuck support member along an inner peripheral face of the guide hole thereby supporting the chuck member such that the chuck member is capable of being eccentric to the rotation major axis; and a control mechanism for controlling a distance of eccentricity between the center axis of the guide hole of the guide member and the rotation major axis by moving the guide member relatively to the rotation major axis in a direction orthogonal to the rotation major axis.

According to the aspect of the present invention, in the holding device for cutting a toric lens, the rotation major axis of the chuck support member is eccentric to the center axis of the guide hole. Therefore, the chuck support member is reciprocated on the displacement straight line by being guided by the inner peripheral face of the guide hole in accordance with the rotation angle of the chuck support member relative to the guide member, in rotating the chuck support member around the rotation major axis. Therefore, the lens workpiece held by the chuck which is supported by the chuck support member, is also reciprocated.

Accordingly, in such a holding device for cutting a toric lens, when the lens workpiece is held and cut by the cutting bit, the locus of the contact point of the cutting bit on the work face, which will be an intrinsic circle if the rotating shaft of the lens workpiece were fixed, can be converted to an approximate ellipse by the reciprocating displacement on the displacement straight line in accordance with the rotation of the lens workpiece, by rotating the lens workpiece.

Further, thereby a point at which the lens workpiece is cut at the same height in the axial direction, is changed in a direction orthogonal to the axis (lens radius direction) around the axis center of the lens workpiece. As a result, the cut face of the lens workpiece is formed in a toric shape having different radii of curvatures in the major axis direction and in the minor axis direction of the approximate ellipse which is the locus of the contact point of the cutting bit.

Further, a difference in the radii of curvatures in the mutually orthogonal meridian directions (degree of toric lens) on the toric face formed as above, can be tuned by adjusting a distance of eccentricity of the rotation major axis of the chuck support member with respect to the center axis of the guide hole of the guide member.

Figure 2:
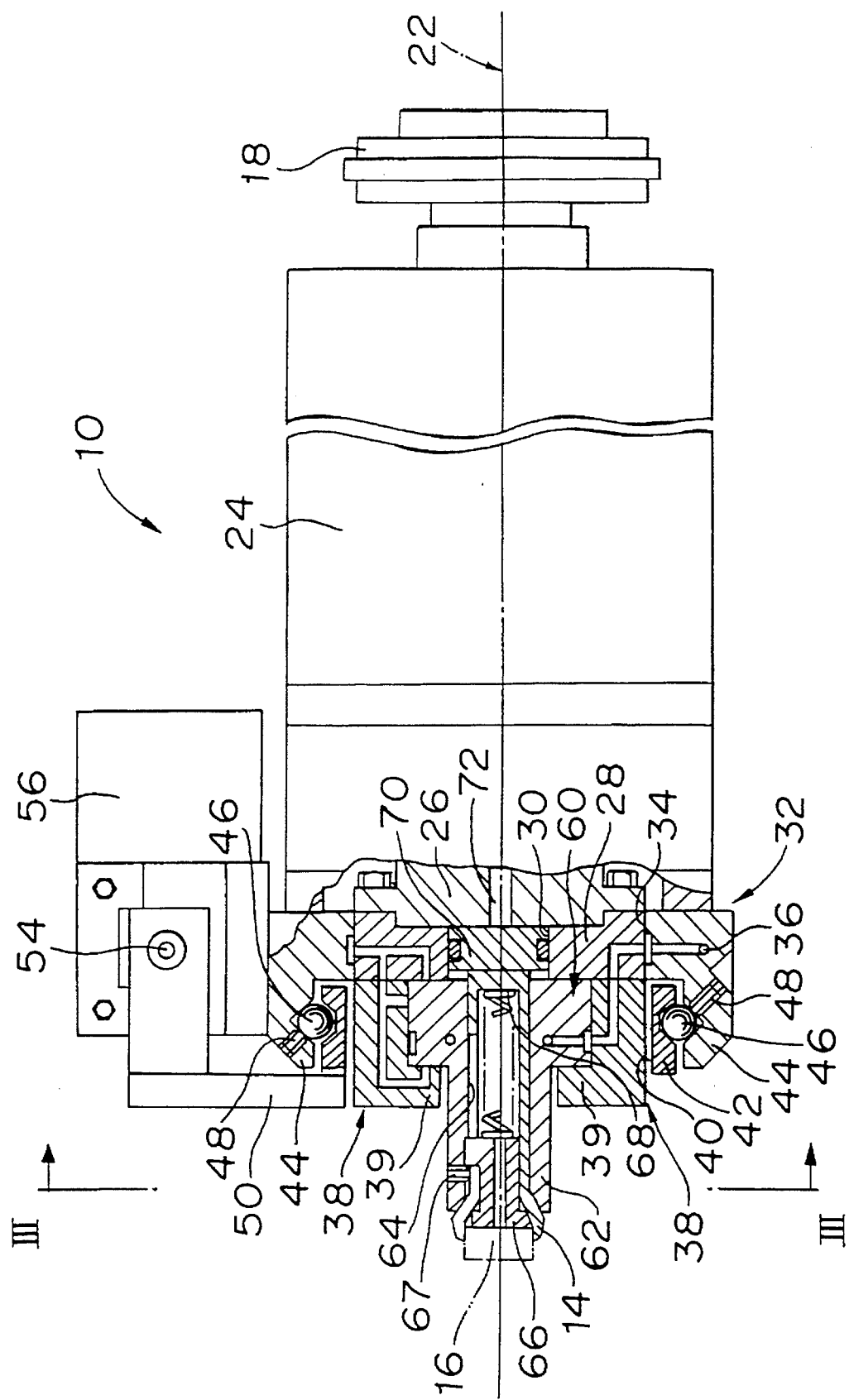
FIG. 2 is a partially cut side diagram showing the holding device of this invention, composing the lathe device shown in FIG. 1.
Figure 4A:
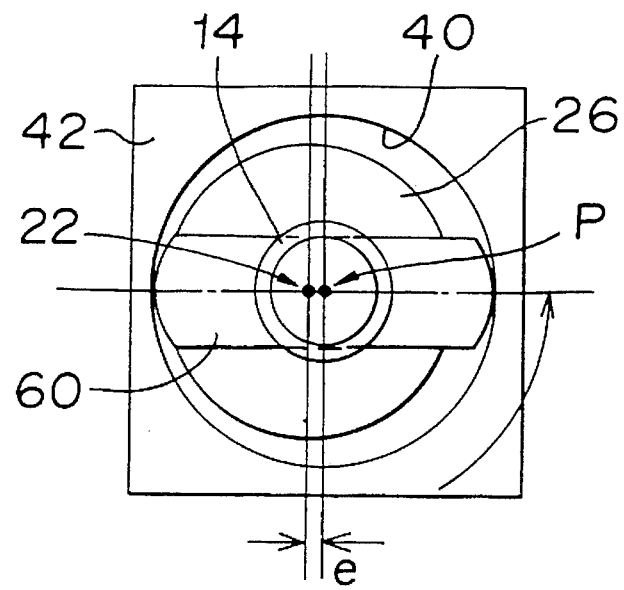
Figure 4B:
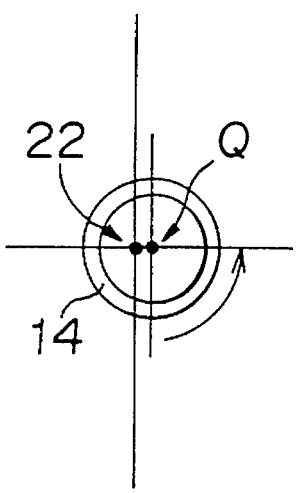
Figure 5A:
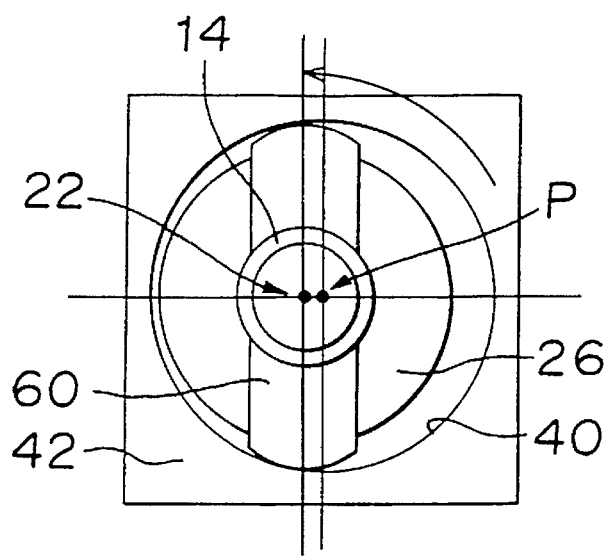
Figure 5B:
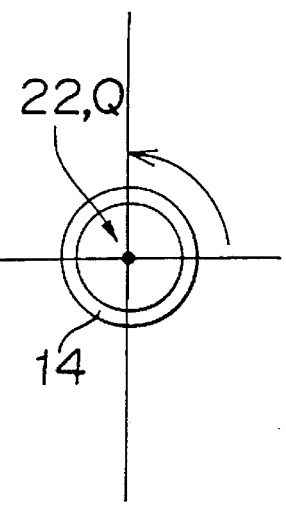
Figure 6A:
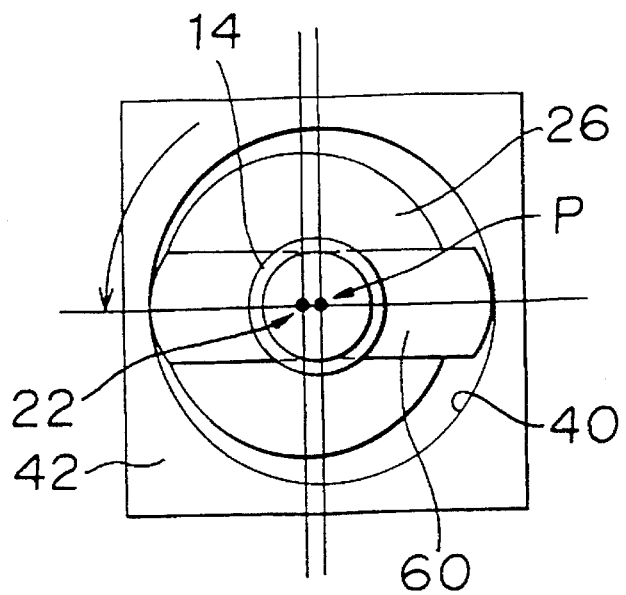
Figure 6B:
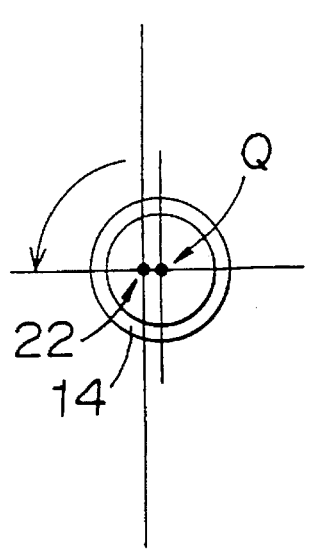
Figure 7A:
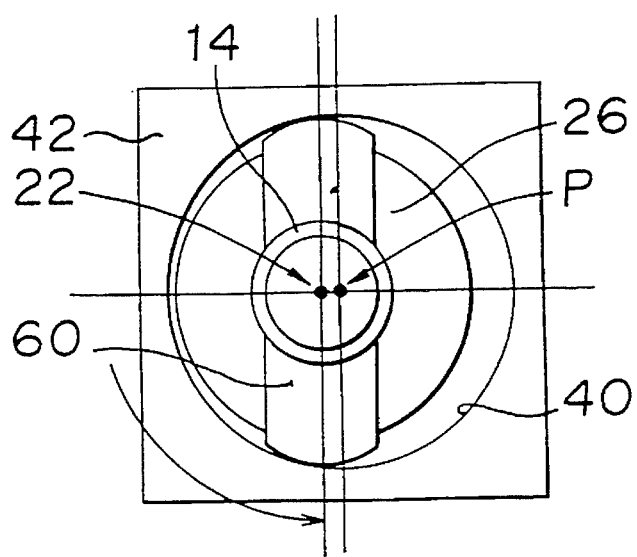
Figure 7B:
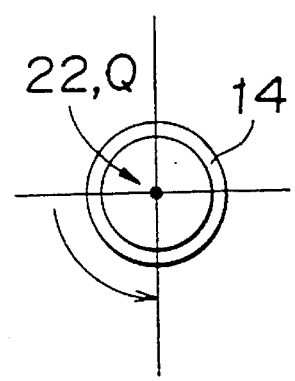
Figure 8:
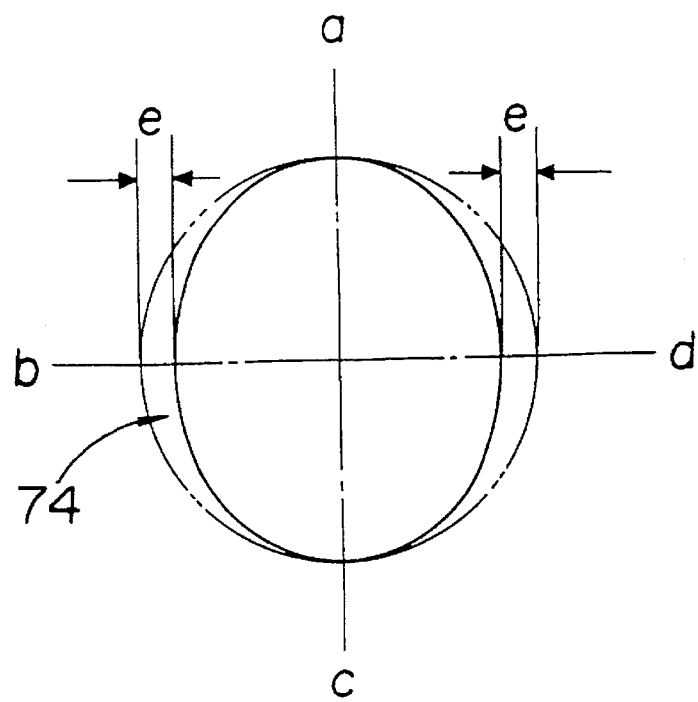
Figure 9:
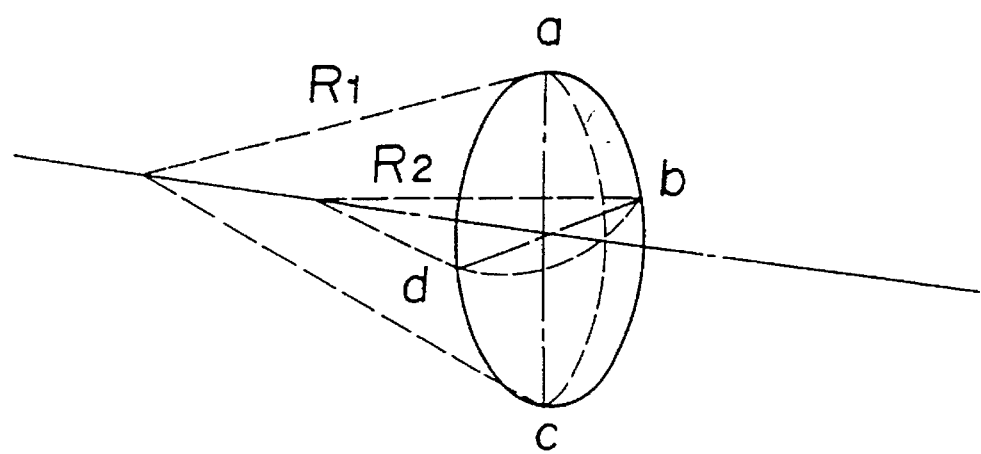
Figure 10:
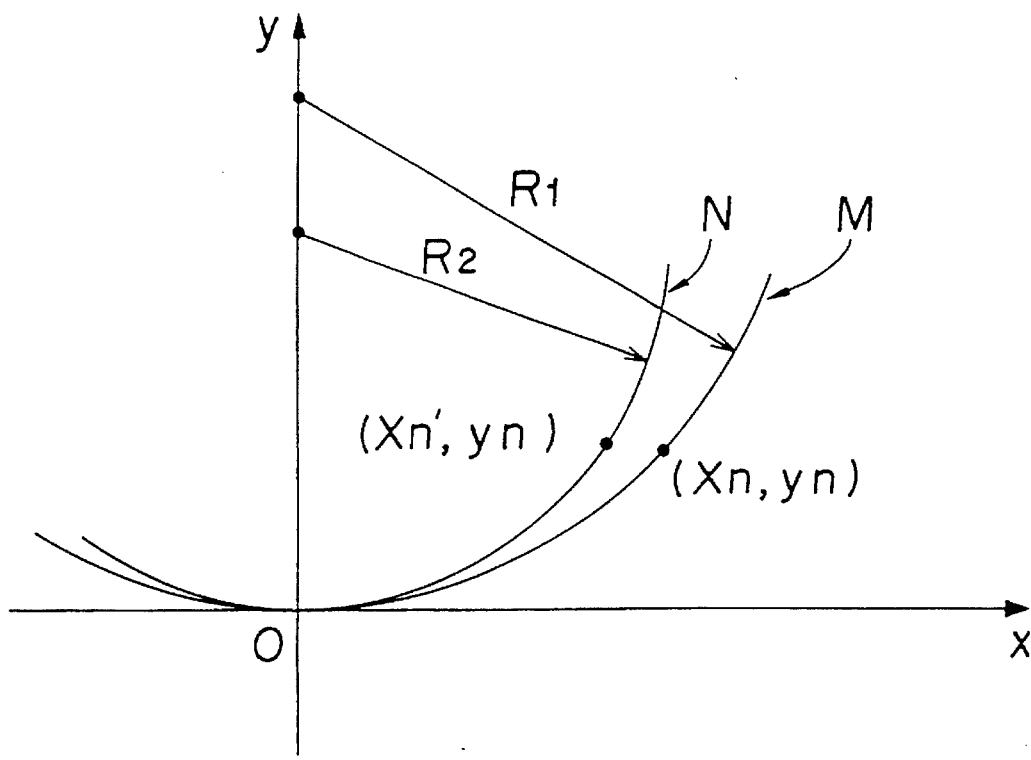
Figure 11:
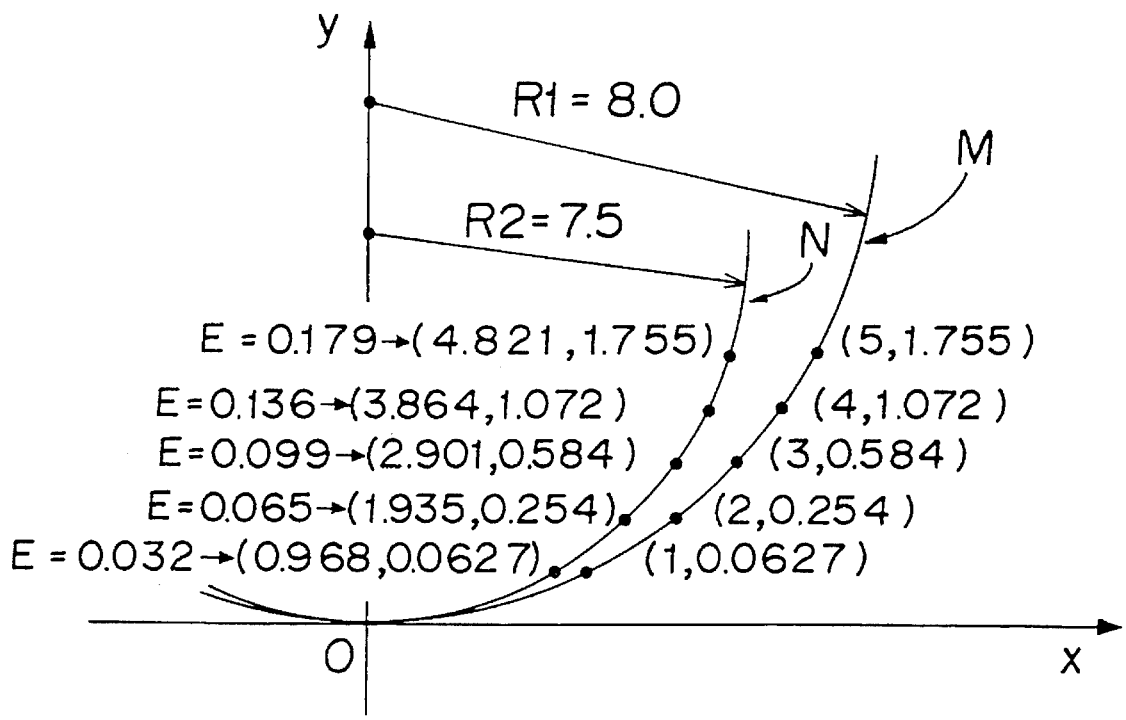

FIGS. 4(a) and 4(b) are respectively explanatory diagrams for explaining a displacement motion of a chuck in the holding device shown in FIG. 2;

FIGS. 5(a) and 5(b) are diagrams respectively showing a state which is different from that in FIG. 4, for explaining the displacement motion of the chuck in the holding device shown in FIG. 2;

FIGS. 6(a) and 6(b) are diagrams respectively showing a state different from those of FIGS. 4 and 5, for explaining the displacement motion of the chuck in the holding device shown in FIG. 2;

FIGS. 7(a) and 7(b) are diagrams respectively showing a state which is different from those in FIG. 4 through 6, for explaining the displacement motion of the chuck in the holding device shown in FIG. 2;

FIG. 8 is an explanatory diagram showing a locus of a cutting bit on a cutting work face of a lens workpiece which is held by the holding device shown in FIG. 2;

FIG. 9 is an explanatory diagram for explaining the shape of a toric face;

FIG. 10 is an explanatory diagram for explaining a shape of a toric face which is formed by a working in use of the holding device shown in FIG. 2; and FIG. 11 is a reference diagram showing an example of specific values in designing a shape of toric face which is formed by the working in use of the holding device shown in FIG. 2.

EXAMPLES

A detailed explanation will be given to Examples of this invention in reference to the drawings to more specifically clarify the present invention as follows.

Figure 1:
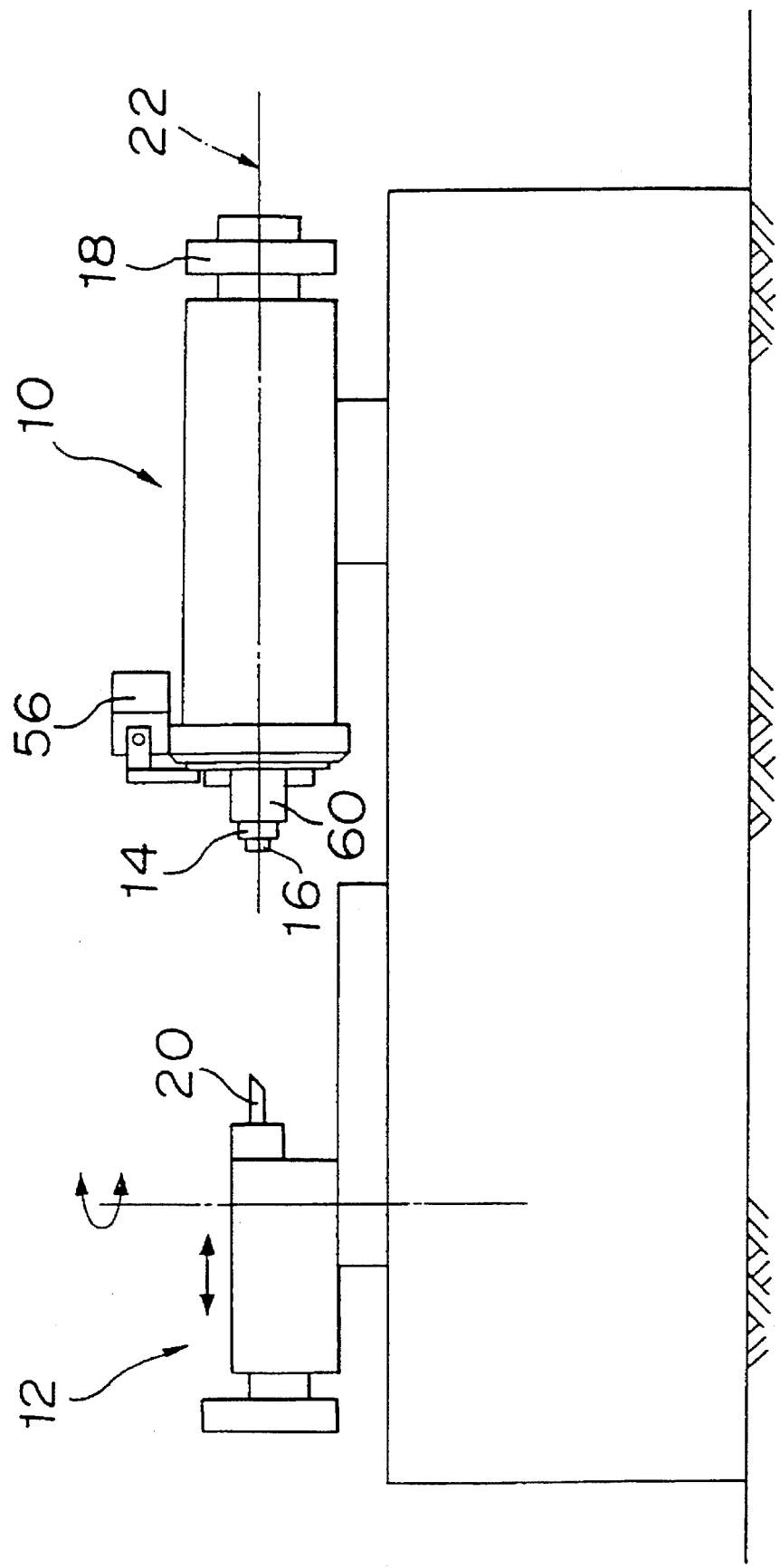
FIG. 1 is a diagram showing an outline of a total construction of a lathe device for a contact lens having a holding device according to the present invention.

First, FIG. 1 shows an outline of a total construction of a lathe device for a contact lens having a holding device for cutting a toric lens in accordance with the present invention. The lathe device is constructed to include a holding device 10 and a cutting device 12 which are opposedly arranged on a base.

The holding device 10 is provided with a chuck 14 at its end portion, and a lens workpiece 16 is held by the chuck 14. Further, the held lens workpiece 16 is rotated by a driving force which is transmitted to a pulley 18 from an outside driving device, not shown.

Further, the cutting device 12 is provided with a cutting bit 20 at its end portion which is opposedly arranged to the holding device 10. The cutting device 12 can be swung around a vertical axis, and can be moved in the horizontal direction, and is moved toward and away from the holding device 10.

In such a lathe device, the lens workpiece 16 is rotated, and at the same time the cutting device 12 is moved in the direction of the holding device 10 thereby cutting the surface of the lens workpiece 16 by the cutting bit 20. Further, the cutting device 12 is moved in the horizontal direction while swinging around a vertical axis, thereby cutting a lens face of target curvatures.

In the holding device 10, the chuck 14 and the lens workpiece 16 are reciprocated in a direction orthogonal to a rotation major axis 22 in accordance with the rotation angle in their rotation. A specific explanation will be given to the structure and the operation of the holding device 10.

Figure 3:
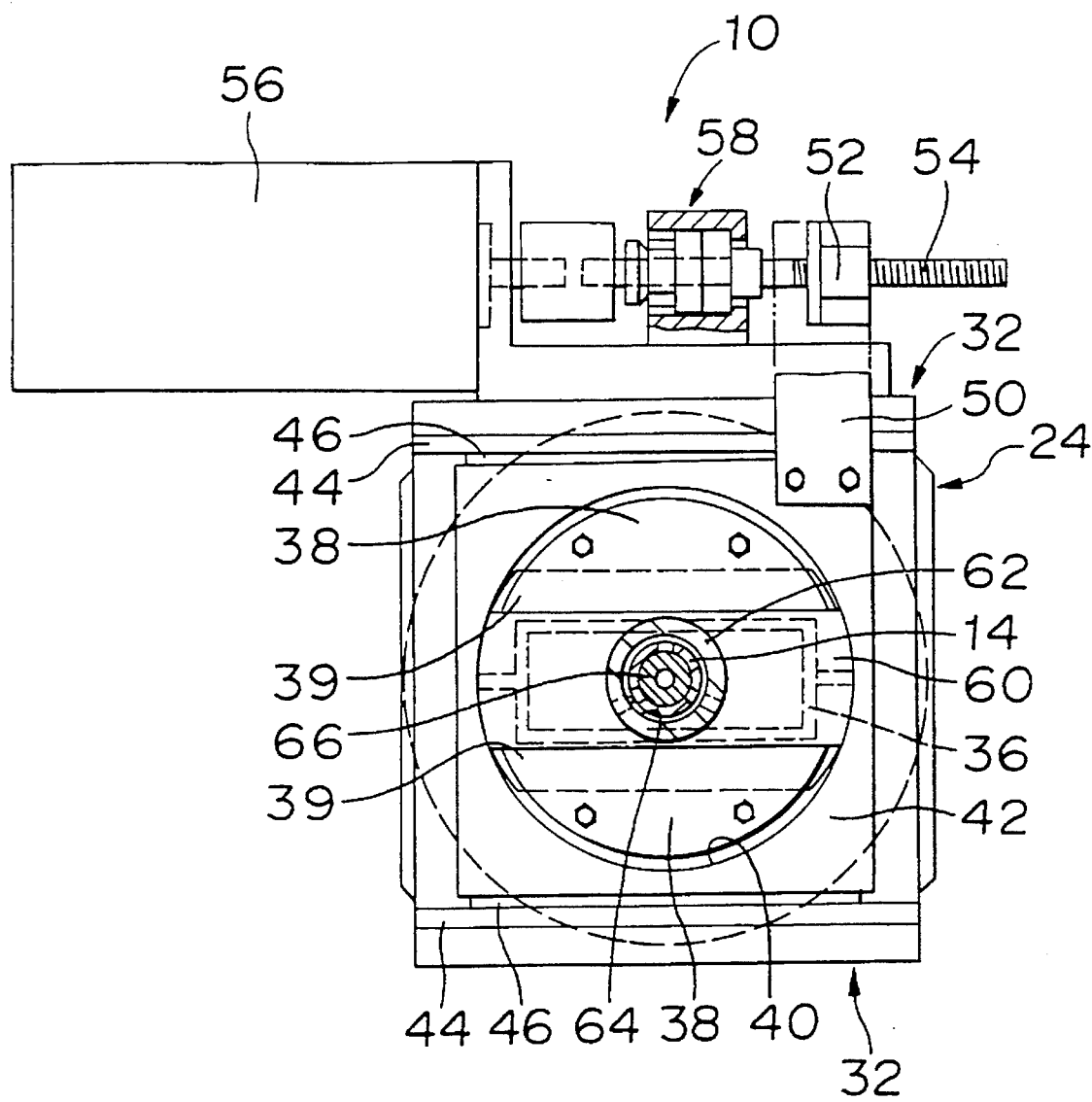
FIG. 3 is a sectional diagram taken along the line III—III in FIG. 2.

First, a detailed construction of the holding device 10 is shown in FIG. 2 and FIG. 3. In the holding device 10, a rotating shaft 26 is provided penetrating to the inside of an approximately cylindrical housing 24. Further, a pulley 18 is attached at an end portion in the axial direction of the rotating shaft 26, and an approximately ring-like attaching plate 28 is fixed to the other end portion in the axial direction by bolts.

The attaching plate 28 is rotatably supported by being fit to a circular support hole 34 of a support member 32 which is fixed to an opening portion of the housing 24, and an end portion on the side of the pulley of the rotating shaft 26 is rotatably supported by a support mechanism, not shown.

Thereby, the rotating shaft 26 is rotatably supported around the rotation major axis 22. Further, an air bearing face is formed on a support face of the support member 32 for the attaching plate 28 by introducing compressed air through an air supply hole 36.

Further, a pair of guide members 38 are fixed by bolts on an outer face in the axial direction of the attaching plate 28, which are disposed on two sides in one radial direction interposing a center hole 30 of the attaching plate 28. Stopper pieces 39 are provided to the guide members 38 which are respectively protruded opposing to each other, at an end portion on the side counter to the side fixed to the attaching plate 28.

A rectangular guide member 42 having a circular guide hole 40 is provided at the outside of the guide members 38 surrounding the guide members 38 apart therefrom by a predetermined distance. Further, support pieces 44 are oppositely disposed which extend in parallel with outer peripheral faces of the guide member 42, and which are protruded integrally with the support member 32. V-grooves are respectively formed on opposing faces of the guide members 42 and the support pieces 44 which are extended in the longitudinal direction. The guide member 42 is connected to the support pieces 44 through guide rods 46 which are fitted among the V-grooves.

Thereby, the guide member 42 is attached to the housing 24 displaceably only in one direction (horizontal direction of FIG. 3) which is the axial direction of the guide rods 46 and which is orthogonal to the rotation major axis 22. The center axis of the guide hole 40 which is provided in the guide member 42 can be eccentric to the rotation major axis 22. In FIG. 2, bolts 48 which are screwed in toward the guide rods 46, are provided for adjusting the position of the center axis of the guide hole 40 that is provided in the guide member 42.

Further, a nut 52 of a ball screw is connected to the guide member 42 through a connecting arm 50. A bolt 54 of the ball screw is driven to rotate by a servo motor 56 which is fixed to the support member 32, whereby the guide member 42 is displaced in the direction orthogonal to the rotation major axis 22. In this Example, the bolt 54 is supported by a support unit 58 thereby preventing the oscillation of center. An amount of displacement of the guide member 42, that is, an amount of eccentricity of the center axis of the guide hole 40 with respect to the rotation major axis 22 is controlled by the servo motor 56 in an order of 0.1 μm.

On the other hand, a chuck support member 60 is provided between opposing faces of the guide members 38, which is disposed in the guide hole 40 of the guide member 40. The chuck support member 60 provides a block shape having a width dimension for fitting between the opposing faces of the guide members 38 and a thickness dimension for fitting between opposing faces of the attaching plate 28 and the stopper pieces 39. The chuck support member 60 is disposed displaceably only on a displacement straight line orthogonal respectively to the opposing direction of the guide members 38 and the rotation major axis 22, by being held by the guide members 38 and the attaching plate 28. Further, air bearing faces are formed on abrasive faces of the chuck support member 60 opposing the guide members 38 and the attaching plate 28, by introducing compressed air through the air supply hole 36.

Further, the two end faces in the displacement direction of the chuck support member 60 are formed respectively in an arcuate shape, which are disposed along an inner peripheral face of the guide hole 40 of the guide member 42. The dimension in the displacement direction of the chuck support member 60 (horizontal length in FIG. 3) is made a little smaller than the diameter of the guide hole 40 of the guide member 42, and the radii of curvatures of the two end faces in the displacement direction having an arcuate shape, are made a little smaller than the radius of the guide hole 40. Further, compressed air is introduced through the air supply hole 36 to the two end faces in the displacement direction of the chuck support member 60. Thereby, clearances are formed between the two end faces in the displacement direction of the chuck support member 60 and the inner peripheral face of the guide hole 40, whereby air bearing faces are formed, and the guide member 42 is displaced such that the rotation of the rotating shaft 26 around the rotation major axis 22 is permitted, even when the center axis of the guide hole 40 is made eccentric to the rotation major axis 22.

By the action of the air bearings formed between the two end faces in the displacement direction and the inner peripheral face of the guide hole 40, the chuck support member 60 is always disposed at the central portion in the displacement direction, in the guide hole 40.

Further, a cylindrical portion 62 is provided which protrudes toward the outside direction in parallel with the rotation major axis 22, at the central portion of the chuck support member 60, and an attaching hole 64 is provided penetrating through the cylindrical portion 62. Further, the chuck 14 is inserted into the attaching hole 64.

The chuck 14 is provided with a shape of an approximate cylinder with bottom, and its opening portion is expandable and retractable by slits extending in the axial direction. A coil spring 68 is accommodated at the bottom portion of the chuck 14, and an opposing block 66 is inserted into the opening portion of the chuck 14, which is disposed as incapable of drawing out from the cylindrical portion 62 by a positioning bolt 67. Thereby, an urging force of the coil spring 68 is applied between the opposing block 62 and the bottom wall of the chuck 14, whereby the chuck 14 is pushed toward the inner direction of the cylindrical portion 62.

Further, when the chuck 14 is pushed in toward the inner direction of the cylindrical portion 62, a contacting force is applied on the chuck 14 by pushing the opening portion of the cylindrical portion 62 onto the outer peripheral face of the opening portion of the chuck 14, whereby the lens workpiece 16 is grabbed by the opening portion of the chuck 14.

The bottom side of the chuck 14 is extended to the inside of the center hole 30 of the attaching plate 28 by penetrating through the attaching hole 64 of the chuck support member 60. Further, a piston member 70 is provided at the inside of the center hole 30 of the attaching plate 28, which is driven by compressed air that is introduced through an air supply hole 72 provided in the rotating shaft 26. The contracting force that is applied on the opening portion of the chuck 14 is released by pushing out the chuck 14 toward the outer direction by the piston member 70, thereby enabling to remove the lens workpiece 16.

Next, an explanation will be given of the operation in cutting the lens workpiece 16 by the cutting device 12, as shown in FIG. 1, wherein the lens workpiece 16 is held by the holding device 10 having the above construction.

First, FIG. 4(*a*) generally shows a state wherein the guide member 42 is displaced in the right direction in the drawing, and the center axis P of the guide hole 40 is disposed eccentric to the rotation major axis 22 by amount of eccentricity e. FIG. 4(*b*) shows the position of the center axis Q of the chuck 14 with respect to the rotation major axis 22. The motion of the chuck support member 60 and the chuck 14 is shown in FIGS. 5(*a*) through 7(*b*), at every rotation angle of 90°, when the rotating shaft 26 is rotated in the counterclockwise direction around the rotation major axis 22, under various states.

Under a state shown in FIGS. 4(*a*) and 4(*b*), the center axis Q of the chuck 14 is disposed eccentric to the rotation major axis 22 in the right direction (direction of eccentricity) in the drawing, by an amount of eccentricity e.

Next, in a state shown in FIGS. 5(*a*) and 5(*b*) wherein the rotating shaft 26 is rotated in the counterclockwise direction by 90° from the above state, the center axis Q of the chuck 14 is disposed on the rotation major axis 22.

Further, under a state shown in FIGS. 6(*a*) and 6(*b*) wherein the rotating shaft 26 is rotated in the counterclockwise direction by 90° from the above state, the center axis Q of the chuck 14 is disposed eccentric to the rotation major axis 22 in the right direction of the drawing (in the direction of eccentricity) by an amount of eccentricity e, as in the state shown in FIGS. 4(*a*) and 4(*b*). However, the chuck 14 is turned the other way round or reversed by 180° from the state shown in FIGS. 4(*a*) and 4(*b*).

Further, under a state shown in FIGS. 7(*a*) and 7(*b*) wherein the rotating shaft 26 is rotated in the counterclockwise direction by 90° from the above state, the center axis Q of the chuck 14 is disposed on the rotation major axis 22 as in the state shown in FIGS. 5(*a*) and 5(*b*). However, the chuck 14 is reversed by 180° from the position shown in FIGS. 5(*a*) and 5(*b*).

By continuously rotating the rotating shaft 26 around the rotation major axis 22, the chuck 14 repeats the states shown in FIGS. 4(*a*) through 7(*b*), and the center axis Q of the chuck 14 is substantially reciprocated in the direction of eccentricity of the center axis P of the guide hole 40 with respect to the rotation major axis 22.

As the result, when the cutting bit 20 of the cutting device 12 contacts the working face of the lens workpiece 16 which is held by the chuck 14 that is rotated while substantially being reciprocated, the locus of the contact point of the cutting bit 20 is not made an intrinsic circle, but a shape similar to an ellipse as shown in FIG. 8. Further, an amount of decrease in radius from that of the intrinsic circle in the minor axis direction (b-d), in an ellipse-like locus 74 formed as above, is equal to the amount of eccentricity e of the center axis of the chuck 14 with respect to the rotation major axis 22.

Accordingly, when the lens workpiece 16 is cut by employing the above holding device 10, a point wherein the cutting is performed by the cutting bit 20 at the same height, is changed in the direction of the lens diameter in accordance with the rotation of the lens workpiece 16. As a result, the cutting work face of the lens workpiece 16 is formed by a toric shape wherein radii of curvatures in the major axis direction (a-c) and the minor axis direction (b-d) in the ellipse-like locus 74 of the cutting bit 20, are different.

As shown in FIG. 9, to form a toric face, it is necessary to set a radius of curvature R1 of a section in a direction of a reference meridian (a-c), and a radius of curvature R2 in a section in a direction of a meridian (b-d) that is orthogonal to the reference meridian, respectively to target values. In the above holding device 10, the radius of curvature R1 in the direction of (a-c), is determined by the swing locus of the cutting bit 20 in the cutting device 12, whereas the radius of curvature R2 in the direction of (b-d) is determined by the amount of eccentricity e of the center axis Q of the chuck 14 with respect to the rotation major axis 22.

As shown in FIG. 10, the section M in the reference meridian direction (a-c) and the section N in the meridian direction (b-d) that is orthogonal to the reference meridian, are respectively shown by the following equation 1 and equation 2.

$$X^2+(y-R1)^2=R1^2 \quad (1)$$

$$X^2+(y-R2)^2=R2^2 \quad (2)$$

The following equation 3 and equation 4 are introduced by equation 1 and equation 2.

$$X_n = \sqrt{R1^2 - (y_n - R1)^2} \quad (3)$$

$$X_n' = \sqrt{R2^2 - (y_n - R2)^2} \quad (4)$$

Further, the amount of eccentricity $e_n$ is expressed by the following equation (5).

$$e_n = X_n - X_n' \quad (5)$$

Therefore, by adjusting and changing the amount of eccentricity $e_n$ in accordance with the cutting point (swing angle of the cutting bit 20), and following the above equations (3) through (5), a toric face can be formed by cutting which is provided with the radii of curvatures of R1 and R2 that are mutually orthogonal, as shown in FIG. 9, by the cutting bit 20 which can be swung with the radius of curvature of R1.

For instance, a result of calculating the amounts of eccentricity e at several points, is shown in FIG. 11, wherein a toric face having the radii of curvature of R1=8 and R2=7.5, is cut by the cutting bit 20 which is swung with the radius of curvature of R1=8.

As is apparent from the above explanation, by employing the holding device 10 of the above construction, a lens having an arbitrary toric shape can be cut without reciprocating the holding device in the direction of the lens axis. Therefore, the construction of the lathe device is extremely simplified and the downsizing and the cost reduction of a driving device can preferably be achieved.

Further, in cutting a toric lens by employing such a holding device 10, a lens product having an optically good quality can easily and stably be provided, since it is not necessary to deform the lens workpiece and the generation of strain or the like can be prevented.

Further, in the holding device 10 of this Example, the support of the chuck support member 60 by the guide members 38 is performed through the air bearing faces, and the friction on these abrasive faces is sufficiently reduced. Therefore, it is possible to rotate the lens workpiece 16 at a high speed, whereby an excellent productivity can be achieved while maintaining a high working accuracy.

Although a detailed description has been given to the Example of this invention, this is only a literal exemplification, and the present invention should not be interpreted as limiting only to such a specific Example. This invention can be performed in embodiments to which various changes, modifications, improvements and the like are added, based on the knowledge of a skilled person in the art. Further, these embodiments are naturally included in the scope of the present invention, so far as they are not out of the gist of the present invention.

For instance, the holding device 10 may be swung instead of swinging the cutting bit 20 of the cutting device 22.

Further, with respect to the position of the air supply holes for forming the air bearing faces among the respective members, the invention should not be interpreted as limiting to the above Example. For instance, in the above Example, the air bearing face formed between the chuck support member 60 and the guide hole 40, is formed by compressed air introduced from the air supply hole 36 that is communicated with the end faces of the chuck member 60. However, a great number of air supply holes may be provided on the side of the guide face (or an air discharging face may be formed that is made of a porous material), thereby forming the air bearing face by discharging air from the side of the guide face to the side of the chuck support member 60.

Further, a specific Example is shown wherein this invention is applied to a holding device for cutting a contact lens. However, the present invention is naturally and preferably applicable to a holding device for cutting various lenses having a toric face other than the contact lens.

As is apparent from the above explanation, in the holding device for cutting a toric lens in accordance with the present invention, a toric face having an arbitrary degree of a toric lens can be cut by adjusting the distance of eccentricity of the center axis of the guide hole of the guide member with respect to the rotation major axis of the chuck support member. Further, it is not necessary to reciprocate the holding device in the direction of lens axis or to bend the lens workpiece in the cutting operation. Therefore, the simplification of construction can preferably be achieved and a toric lens having an extremely good quality can stably be formed.

We claim:

1. A holding device for cutting a toric lens for holding a lens workpiece in forming a toric lens by cutting the lens workpiece comprising:

a chuck member for holding the lens workpiece and having a chuck member axis;

a guide member having a circular guide hole provided outside of the chuck member;

a chuck support member provided in the circular guide hole of the guide member, said chuck support member rotatable around a rotation major axis and displaceable on a displacement line orthogonal to the rotation major axis, such that said chuck member axis is displaced on the displacement line during rotation of the chuck support member relative to the guide member, said chuck support member including guiding end portions which move along and are guided by contact with an inner peripheral face of the guide hole during rotation of said chuck support member, and wherein said rotation major axis is eccentric to a center axis of the circular guide hole such that during rotation of said chuck support member said chuck member rotates and said chuck member axis moves along said displacement line; and a control mechanism for controlling a distance of eccentricity between the center axis of the guide hole of the guide member and the rotation major axis by moving the guide member relative to the rotation major axis in a direction orthogonal to the rotation major axis.

2. The holding device of claim 1, further including a pair of chuck support member guide members between which said chuck support member is disposed, said pair of chuck support member guide members spaced from one another in a width direction of said chuck support member, and wherein said chuck support member is movable with respect to said chuck support member guide members in a direction orthogonal to said width direction.

3. The holding device of claim 2, wherein said pair of chuck support member guide members are connected to an attaching plate which is rotated by a shaft, said shaft rotating about said rotation major axis to thereby rotate said pair of chuck support member guide members and said attaching plate about said rotation major axis, and wherein said chuck support member is at least partially disposed between said chuck support member guide members and said attaching plate with respect to a direction parallel to said rotation major axis.

4. The holding device of claim 3, further including an attaching plate support member supporting said attaching plate for rotation.

5. The holding device of claim 4, further including means for forming an air bearing between said attaching plate and said attaching plate support member.

6. The holding device of claim 4, wherein said attaching plate support member further supports said guide member for movement in a direction orthogonal to said rotation major axis.

7. The holding device of claim 6, further including at least one guide rod disposed between said attaching plate support member and said guide member.

8. The holding device of claim 4, further including means for forming an air bearing between said guiding end portions of said chuck support member and said circular guide hole.

9. The holding device of claim 1, further including means for forming an air bearing between said guiding end portions of said chuck support member and said circular guide hole.

10. A holding device for cutting a toric lens comprising:

a rotating shaft rotating about a rotation major axis;

a chuck having a chuck axis;

a chuck support member having said chuck connected thereto, said chuck support member having first and second guiding ends;

a chuck support member guide rotating with said rotating shaft about said rotation major axis to thereby rotate said chuck support member, wherein said chuck support member is movable relative to said chuck support member guide in a direction orthogonal to said rotation major axis;

a guide member having a guide hole, said guide hole having a diameter larger than a length of said chuck support member from said first guiding end to said second guiding end, said first and second guiding ends moving along and being guided by contact with an inner peripheral face of said guide hole during rotation of said rotating shaft, said guide hole having a center guide hole axis which is eccentric to said rotation major axis in a displacement direction orthogonal to said rotation major axis, wherein rotation of said rotating shaft causes said chuck to rotate and said chuck axis to move along a line perpendicular to said rotation major axis; and means for moving said guide member along said displacement direction to vary an amount of eccentricity between said center guide hole axis and said rotation major axis.

11. The holding device of claim 10, wherein during rotation of said rotating shaft, said chuck axis moves between a position along said rotation major axis and a position along said guide hole center axis.

12. The holding device of claim 10, wherein during rotation of said rotating shaft, said chuck axis moves between first and second positions, and wherein said first and second positions are disposed along a straight linear line which extends in said displacement direction.

13. The holding device of claim 10, further including means for forming an air bearing between said first and second guiding ends of said chuck support member and said guide hole.

* * * * *